United States Patent Office 2,745,499
Patented May 15, 1956

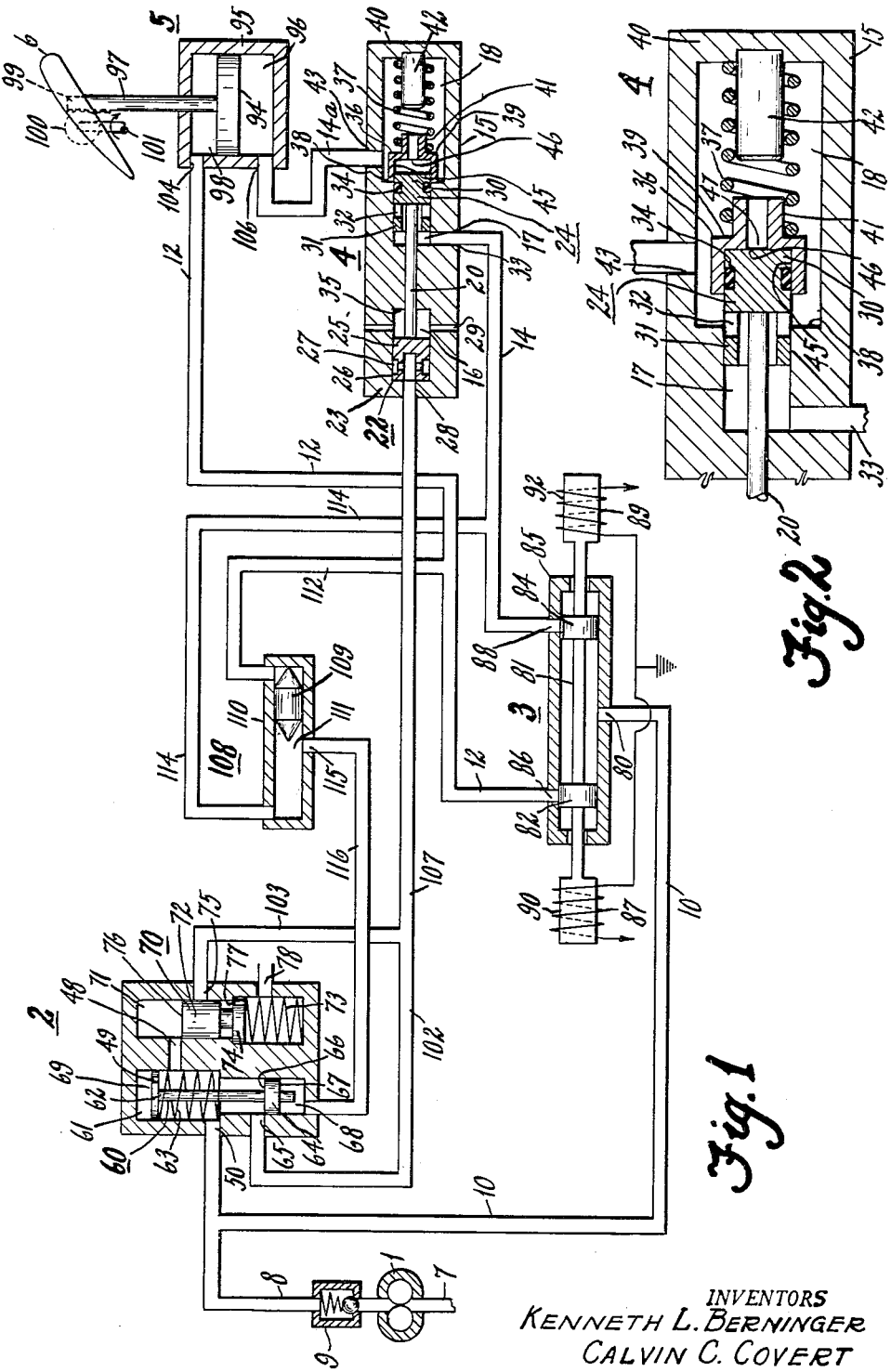

2,745,499

PROPELLER CONTROL

Kenneth L. Berninger, Dayton, and Calvin C. Covert, Vandalia, Ohio, assignors to General Motors Corporation, Detroit, Mich., a corporation of Delaware Application December 26, 1951, Serial No. 263,416

9 Claims. (Cl. 170—160.21)

The present invention relates to a control system for variable pitch propellers and more particularly to a fluid pressure system for controlling the movement of propeller blades.

It is well known that some propeller blades in flight have an inherent tendency, due to aerodynamic and centrifugal twisting moments, to turn about their longitudinal axes toward a decrease pitch position. The turning of the blades to a decrease or lesser pitch position while an aircraft is in flight, due to a failure in the fluid pressure system controlling movement of the blades, may cause the pilot to lose control of the aircraft. Accordingly, one of our objects is to provide a fluid pressure system for controlling the movement of the blade or blades of a variable pitch propeller assembly having incorporated therein a means for preventing movement of the blade or blades to a decrease pitch position, or in other words to enable the propeller to operate as a fixed pitch propeller upon failure of the fluid pressure operating system.

The aforementioned and other objects of the present invention are accomplished by providing a pitch lock valve that prevents movement of a blade actuating motor towards a decrease pitch position upon any failure occurring in the fluid pressure system provided for actuating the motor. Specifically, the fluid pressure system of the present invention includes a source of fluid pressure, pressure regulating means, a distributor valve, a pitch lock valve and a blade actuating servomotor. The pitch lock valve is positioned in circuit connection between the distributor valve and the increase pitch chamber of the servomotor. The pitch lock valve only allows communication between the distributor valve and the increase pitch chamber of the servomotor when the pump, constituting the source of pressure, and the pressure regulating means are operating normally. The pitch lock valve is adapted to be moved to the open position by either of two servo pistons and is moved to the closed position by fluid pressure and a spring. One of the servo pistons is actuated by the diverted drain flow from the pressure regulating means, and the other servo piston is actuated by the fluid flow controlled by the distributor valve when it is moved to a position where it directs fluid flow to the servomotor in a manner tending to increase the pitch of the propeller blades. The pitch lock valve is normally maintained in the open position by means of the servo piston actuated by the diverted flow from the pressure regulating means. When the pitch lock valve is in the open position, the distributor valve may direct fluid flow to and from either the decrease or increase pitch chambers of the servomotor, as the pitch lock valve, when open, will allow the flow of fluid to and from the increase pitch chamber. However, if the pressure source fails, or if the pressure regulating means operates in an abnormal manner, the pitch lock valve servo piston actuated by the drain flow from the pressure regulating means will not maintain the pitch lock valve in the open position. In this instance fluid flow from the increase pitch chamber to drain will assist the spring inclosing the pitch lock valve, and flow will be blocked by the pitch lock valve, the propeller maintaining a fixed pitch position. However, the servo piston, actuated by flow to the increase pitch chamber, will maintain the pitch lock valve in the open position, if the distributor valve is so directing the fluid flow to increase propeller pitch, regardless of any abnormality in the operation of the pressure regulating means. The specific fixed pitch position at which the propeller will be maintained, will be the pitch position of the propeller at the time the fluid pressure system became defective.

Further objects and advantages of the present invention will be apparent from the following description, reference being had to the accompanying drawings wherein a preferred embodiment of the present invention is clearly shown.

In the drawings:

Fig. 1 represents a schematic view of the fluid circuit for the propeller control system.

Fig. 2 is an enlarged fragmentary view of the pitch lock valve shown in Fig. 1, the valve being shown in the open position.

Referring more particularly to Fig. 1 of the drawings, system pump 1 operates continuously during propeller rotation to supply fluid pressure to trunk line 10. The pump 1 has an intake line 7 and an outlet line 8. The outlet line 8 is connected to the trunk line 10, and is provided with a check valve 9 which prevents fluid flow from line 10 back through the pump 1. Trunk line 10 communicates with pressure regulating means 2 and distributor valve 3. The distributor valve is connected by lines 12, 14 and 14a to a servomotor 5 which is provided with means for adjusting propeller pitch. A pitch lock valve 4 is positioned between lines 14 and 14a that connect the distributor valve 3 with the servomotor 5.

Referring more particularly to Figs. 1 and 2 of the drawings, the pitch lock valve 4 is housed in a casing 15. The casing 15 is provided with chambers 16, 17 and 18. The pitch lock valve comprises a plunger 20 having pistons 22 and 24, respectively, at opposite ends thereof. Piston 22 is housed in chamber 16 of the casing 15, and comprises a head member 25 provided with an axially extending annular flange or skirt 26. The annular flange 26 is provided about its periphery with a series of spaced holes 27. Chamber 16 is provided with an inlet port 28 and a series of outlet ports 29. Piston 24 is housed in chamber 17 of the casing 15, and likewise comprises a head member 30 having an axially extending annular flange or skirt 31 provided with a series of peripheral openings 32. In addition, head member 30 is provided with an annular peripheral groove between its end surfaces in which a rubber O-ring 34 is situated. The rubber O-ring 34 insures a fluid-tight seal between the engaging surfaces of the piston head 30 and the chamber 17. Chamber 17 is provided with an inlet port at 33. When the surfaces of piston head 30 and the chamber 17 are in engagement, communication between chambers 17 and 18 of the casing 15 is blocked.

Within chamber 18, a hollow cap member 36 is urged by means of spring 37 against end wall 38 of the chamber 18. The spring 37 seats against an annular flange 39 of the cap member 36 at one end and at the other end seats against end wall 40 of the chamber 18. Cap member 36 is provided with a hollow extension 41 that is encompassed by the spring 37. The other end of the spring 37 encompasses a cylindrical stop member 42 which is secured to the end wall 40 of chamber 18. Chamber 18 is provided with a port 43 located between its end walls 38 and 40.

A portion of the surface of piston head 30 is always in engagement with the inner surface 45 of the hollow cap member 36, the diameter of the piston head and the inner diameter of the cap member being substantially equal. Movement of the plunger 20 in one direction is limited by the engagement of the end of annular flange 26 of the piston 22 with one end wall 23 of chamber 16, and movement of the plunger in the other direction is limited by engagement of piston head 25 with the other end wall 35 of chamber 16. When plunger 20 is moved to the right, as shown in Fig. 2 of the drawings, piston head 30 will first move into the opening defined by the inner surfaces of the hollow cap member 36. Cap member 36 has a recess of sufficient length so that the inner surface 45 will engage the outer peripheral surface of rubber O-ring 34. The engagement of rubber O-ring 34 with the inner surface 45 of the cap member 36 protects the O-ring from being stretched or chaffed against the end wall 38 of chamber 18 during movement of piston head 30. Thus, the O-ring 34 is always maintained in its annular groove in piston head 30. This provision greatly increases the length of time during which the O-ring will effect a fluid seal.

When the end of piston head 30 engages the inner annular end wall 46 of the cap member 36, further movement of the plunger 20 will move the edge of the cap member away from end wall 38 of chamber 18. Movement of cap member 36 away from wall 38 is limited by the engagement of the end of hollow extension 41 with the end of stop 42. When the edge of cap member 36 is moved away from the end wall 38 so that openings 32 in the annular flange 31 of piston 24 are in communication with chamber 18, the pitch lock valve 4 is in the open position. In the open position of the pitch lock valve, port 33 of chamber 17 is in communication through openings 32 with port 43 of the chamber 18. When the pitch lock valve is in the position allowing communication between ports 33 and 43, piston 22 will be in a position wherein openings 27 will allow communication between port 28 and openings 29.

Port 33 is connected to line 14 and port 43 is connected to line 14a. As lines 14 and 14a constitute one of the connections between the distributor valve 3 and the servomotor 5, if the pitch lock valve 4 is in the open position, fluid may flow to and from the servomotor through lines 14 and 14a. However, if the pitch lock valve is in the closed position, fluid flow to or from the servomotor 5 from the distributor valve is blocked.

The component parts of the fluid system are mounted in a regulator of the type shown in the Blanchard et al. Patents 2,307,101 and 2,307,102. Fluid pressure from pump 1 is constantly supplied to port 50 of the pressure regulating means 2. The pressure regulating means 2 comprises an equal area valve 60 and a pressure relief valve 70. The equal area valve embodies a plunger 62 located in chamber 61 of the pressure regulating means. The plunger 62 is urged by a spring 63 toward the upper end of the chamber in which position, land 64 tends to close a relief port 65. When relief port 65 is opened, the pressure in chamber 61 and in trunk line 10 is reduced. Fluid pressure in chamber 61 tends to move the plunger 62 so that land 64 will open port 65 by acting on surface 66 of the land. However, port opening movement of the plunger 62 is opposed by the combined forces of spring 63 and centrifugal force which act to thrust the plunger upwardly so that land 64 tends to close port 65. A second surface 67 of the land 64 is exposed to the fluid pressure in chamber 68. The opposed surface areas of land 64 that are exposed to the fluid pressures in chambers 61 and 68, respectively, are equal. This requires pump 1 to operate at a pressure equivalent to the load of spring 63 and centrifugal force acting on the plunger, plus the pressure in chamber 68. Piston member 69, apertured at 49, acts as a dashpot to damp the movements of the plunger 62.

Pressure relief valve 70 is located in chamber 71 of the pressure regulating means 2, chambers 61 and 71 being connected by a passage 48. The pressure relief valve 70 comprises a piston valve 72, urged upwardly by a spring 73 acting on flange member 74, and by centrifugal force. Piston 72 ordinarily covers an exhaust port 75, which is connected to drain when the fluid pressure acting on surface 76 of the piston overcomes the thrust of spring 73 and centrifugal force. The piston 72 and port 75 combined represent a pressure relief valve mechanism that limits the maximum pressure of the system. Flange member 74 is provided with an opening 77 through which fluid trapped between piston 72 and flange member 74 may drain through port 78.

Trunk line 10 is connected to supply port 80 of the distributor valve 3. The distributor valve embodies a spool valve 81 having spaced lands 82 and 84, moveable within a valve guide 85 having spaced controlled ports 86 and 88 cooperating with lands 82 and 84, respectively. Spool valve 81 is provided at each end with armatures 90 and 92, respectively. Solenoid windings 87 and 89 cooperate with armatures 90 and 92, respectively, the windings being energized by a suitable electrical system not shown. Port 86 is connected by means of line 12 and port 88 is connected by means of lines 14 and 14a to the servomotor 5.

The servomotor 5 comprises a cylinder 95 having therein a piston 94 which divides the cylinder into an increase pitch chamber 96 and a decrease pitch chamber 98. The piston 94 is connected by rod 97 to a rack 99 that meshes with a pinion gear 100. Pinion gear 100 is secured to the propeller blade 6, and movement of pinion 100, effected by rack 99, adjusts the pitch of the propeller blade 6. It is to be understood that each blade of the variable pitch propeller is provided with a similarly actuated mechanism for adjusting the pitch of the blades. The blade 6 is rotated by a shaft 101 in the direction suggested by the arrow.

Line 12 communicates with port 104 of the cylinder and the decrease pitch chamber 98. Line 14a communicates with port 106 of the cylinder and the increase pitch chamber 96. The fluid pressure existing in lines 12 and 14 is transmitted by means of lines 112 and 114 to opposite sides, respectively, of a shuttle valve 108. The shuttle valve comprises a casing 110 having a chamber 111 within which is movable a shuttle valve member 109. Line 112 communicates with one end of the chamber 111 and line 114 communicates with the other end of chamber 111. Intermediate its ends, chamber 111 is provided with a port 115 that communicates with one end of line 116. The other end of line 116 communicates with chamber 68 of the equal area valve 60. Whichever of the lines 12 or 14 has the greater pressure therein, this pressure will be communicated through the shuttle valve to chamber 68 of the equal area valve. As the pressure in either of the lines 12 or 14 is determined by the amount of opening of control ports 86 or 88 of the distributor valve, the pressure transmitted to chamber 68 of the equal area valve will be an indication of the pressure demanded by the servomotor 5 needed to carry out its control function. During normal operation of the propeller, the fluid pressure in chamber 68 will never be sufficient, when combined with the forces of spring 63 and centrifugal force acting on the plunger 62, to cause land 64 to completely close port 65. However, during abnormal operation of the propeller, the port 65 may be entirely closed off by land 64, thus causing an abnormal operation of the pressure regulating means 2.

Port 65 of the equal area valve 60 and port 75 of the pressure relief valve 70 are connected by lines 102 and 103, respectively, to line 107. Line 107 communicates with port 28 of the pitch lock valve 4, and subjects servo piston 22 to the pressure existing in line 107. The pitch lock valve 4, previously described, is multiple servo actuated; i. e. it can be moved and maintained in the open position by either of the servo pistons 22 or 24. During normal operation of the fluid pressure system, including the pump 1 and the pressure regulating means 2, a portion of the fluid flow from the pump will be diverted through port 65 of the equal area valve 60 into lines 102 and 107. This diverted flow will pass through port 28 of the pitch lock valve 4 and into chamber 16 where it will move the piston 22 and plunger 20 so that openings 27 of piston 22 and openings 32 of piston 24 will communicate, respectively, with openings 29 and port 43 of the pitch lock valve 4. When the pitch lock valve 4 is in the position wherein openings 32 of piston 24 allow communication between ports 33 and 43, the distributor valve 3 may control the flow of fluid to and from the servomotor 5 and, thus, control the propeller pitch. Thus, if the distributor valve is moved to the left, as viewed in Fig. 1 of the drawings, pressure fluid supplied to the annular channel between lands 82 and 84 of the spool valve 81 may flow through port 86, line 12 and port 104 to the decrease pitch chamber 98 of the servo-motor. Fluid in increase pitch chamber 96 of the servomotor may drain through port 106, line 14a, port 43, openings 32, port 33, line 14 and port 88 of the distributor valve. Conversely, if the distributor valve is moved to the right, as viewed in Fig. 1 of the drawings, pressure fluid from port 80 of the distributor valve will flow through port 88, line 14, port 33, openings 32, port 43, line 14a and port 106 to the increase pitch chamber 96 of the servomotor. In this instance fluid may drain from decrease pitch chamber 98, through port 104, line 12, and port 86 of the distributor valve. Hence, it is seen that if the fluid pressure system is operating normally, the diverted drain from the equal area valve will maintain the pitch lock valve in the open position to allow control of propeller pitch by the distributor valve.

However, if the pump fails to produce sufficient pressure to cause land 64 to open port 65 of the equal area valve, servo piston 22 will not maintain the pitch lock valve in the open position, and spring 37 and fluid pressure acting on surface 47 of piston head 30 will urge cap member 36 and piston 24 to a position where the communication between port 43 and openings 32 of the piston 24 will be blocked. Similarly, if the pressure demanded by the servomotor 5, in carrying out a control function called for by the distributor valve 3, in moving to a decrease pitch position is sufficient to cause land 64 to close port 65 of equal area valve, the pitch lock valve 4 will again be moved to the closed position; under the combined forces of fluid pressure from chamber 96 of the servomotor, acting on surface 47 of the piston head 30, and the spring 37. The pitch lock valve will not be moved to the open position until the pressure produced by the pump 1 is sufficient to cause piston 72 to open relief port 75, thus allowing fluid flow into chamber 16 of the pitch lock valve. By this provision, too rapid a change to a decrease pitch position is prevented, as the pitch lock valve will only allow blade movements toward the decrease pitch position when port 65 of the equal area valve is open. When the pitch lock valve is in the closed position, fluid from increase pitch chamber 96 cannot flow to drain through line 14a and port 43, and the pitch of the propeller will be maintained at a fixed position. Thus, it is seen that the pitch lock valve 4 functions to maintain the propeller pitch at a fixed magnitude if the pump fails or if the pressure regulating means operates in an abnormal manner.

Servo piston 24, when acted upon by fluid pressure in chamber 17, can also move the pitch lock valve to the open position independently of servo piston 22. However, fluid pressure is only communicated to chamber 17 when the distributor valve 3 is moved to a position calling for an increase propeller pitch. At this time, fluid pressure in the annular channel between lands 82 and 84 of the distributor valve may be transmitted through port 88, line 14, and port 33 to chamber 17 of the pitch lock valve. This pressure acting on the surface of piston head 30 will move piston 24 to a position where openings 32 will communicate with chamber 18 and port 43. Thus, whenever the distributor valve is moved to a position calling for an increase in propeller pitch, fluid may flow through line 14, port 33, openings 32, port 43, and line 14a to the increase pitch chamber 96 of the servomotor. Hence, it is seen that even though the pressure regulating means may be operating abnormally, servo piston 24 of the pitch lock valve will maintain the pitch lock valve in the open position irrespective of servo piston 22, when fluid flow is from the distributor valve to the increase pitch chamber 96. However, the pitch lock valve will at all times prevent fluid flow from increase pitch chamber 96 to drain, and thus prevent blade movement to a lesser pitch position whenever the fluid pressure system fails or operates in an abnormal manner. This result is achieved by reason of the fact that fluid pressure from increase pitch chamber 96 at all times acts on surface 47 of piston head 30 and assists the spring 37 in tending to close the pitch lock valve. The combined forces of fluid pressure from servomotor chamber 96 and spring 37, acting on surface 47 of the piston head 30, must be overcome by the fluid pressure in chamber 16 of the pitch lock valve to maintain the valve in the open position allowing fluid to drain from servomotor chamber 96. Hence, it is apparent that the pitch lock valve will maintain a fixed propeller pitch if the fluid pressure system operates defectively, and the aerodynamic and centrifugal twisting movements acting on the blades will be unable to decrease the propeller pitch.

While the embodiment of the present invention as herein disclosed, constitutes a preferred form, it is to be understood that other forms might be adopted.

What is claimed is as follows:

1. In a control system for a variable pitch propeller subject to an external force tending to reduce the pitch position thereof, the combination including a fluid motor for adjusting propeller pitch, a fluid pressure system for actuating said motor, said system comprising a source of fluid pressure, pressure regulating means operatively connected with the source and the motor and operable to maintain a predetermined pressure differential between said source and said motor, and a valve having connection with said source and a pair of conduits connected to said motor for controlling fluid flow to and from said motor, and servo actuated means in one of said conduits, said servo actuated means having connection with said pressure regulating means and maintaining a fixed propeller pitch upon failure of said fluid pressure system by trapping fluid in said motor.

2. In a control system for a variable pitch propeller subject to an external force tending to reduce the pitch position thereof, the combination including, a fluid motor for adjusting blade pitch position, a fluid pressure system for actuating said motor, said system comprising a source of fluid pressure, pressure regulating means operatively connected with said source and said motor and operable to maintain a predetermined pressure differential between said source and said motor and a valve having connection with said source and a pair of conduits connected with said motor for controlling fluid flow to and from said motor, valve means in one of said conduits between said control valve and said motor, means for actuating said valve means so that it prevents blade movement toward a lesser pitch position when the pressure regulating means operates abnormally, and means for actuating said valve means so that it permits blade movement toward a greater pitch position regardless of abnormal operation of the pressure regulating means.

3. In a control system for a variable pitch propeller subject to an external force tending to reduce the pitch position thereof, the combination including, a fluid motor for adjusting blade pitch position, a fluid pressure system for actuating said motor, said system comprising a source of fluid pressure, pressure regulating means operatively connected with said source and said motor and operable to maintain a predetermined pressure differential between said source and said motor and a valve having connection with said source and a pair of conduits connected with said motor for controlling fluid flow to and from said motor, valve means in one of said conduits between said control valve and said motor, means including a first servo piston for actuating said valve means so that it prevents blade movement toward a lesser pitch position when the pressure regulating means operates abnormally, and means including a second servo piston for actuating said valve means so that it permits blade movement toward a greater pitch position regardless of abnormal operation of the pressure regulating means.

4. A fluid pressure system including in combination, a fluid pressure operated motor having a movable member capable of fluid pressure actuation in either direction and subject to an external force tending to move the member in one direction, a source of fluid pressure for actuating said motor, pressure regulating means operatively connected with said source and said motor for maintaining a predetermined pressure differential between said source and said motor and diverting excess flow from said source to a drain conduit, a control valve having connection with the source and a pair of control conduits connected with the motor on opposite sides of the movable member, and a blocking valve having connection with said source and disposed in one of said control conduits between said control valve and said motor, said blocking valve including an actuating surface having connection with said drain conduit and being responsive to the pressure of said diverted flow to normally maintain fluid connection between said motor and said control valve, but operable to block said connection and prevent movement of the motor member by trapping fluid on one side of said motor member in the absence of said diverted flow from the pressure regulating means.

5. The combination set forth in claim 4 wherein said blocking valve is in the control conduit through which fluid flows to the motor in opposing relation to said external force.

6. The combination set forth in claim 4 wherein said blocking valve includes a second actuating surface having connection to said one control conduit, and resilient means operatively associated with said blocking valve to move it to a closed position in absence of fluid pressure application of predetermined potential to either of said actuating surfaces.

7. In a control system for a variable pitch propeller subject to an external force tending to reduce the pitch position thereof, the combination including, a servo-motor for adjusting propeller pitch, a fluid pressure system comprising a pressure source and a valve having connection with said source and a pair of conduits connected with said motor for controlling fluid flow to and from the servo-motor, a pitch lock valve located in one of said conduits between said control valve and the servo-motor, first servo actuated means having connection with said source for maintaining said pitch lock valve in an open position during normal operation of said fluid pressure system, means operable to maintain said pitch lock valve in a closed position during defective operation of said fluid pressure system, and second servo actuated means for opening said pitch lock valve when said control valve is directing fluid flow to the servo-motor in a manner tending to increase the pitch position of said propeller irrespective of defective operation of said fluid pressure system, said second servo actuating means including a piston and means subjecting said piston to the fluid flow directed by said control valve to said servo-motor in a manner tending to increase the propeller pitch position.

8. In a control system for a variable pitch propeller subject to an external force tending to reduce the pitch position thereof, the combination including, a servo-motor for adjusting propeller pitch, a fluid pressure system comprising a pressure source and a valve having connection with said source and a pair of conduits connected with said servo-motor, pressure regulating means connected with said source and with said motor for maintaining a predetermined pressure differential between said source and said motor and diverting excess flow from said source to a drain conduit, a pitch lock valve located in one of said conduits between said control valve and said servo-motor, a piston having connection with said drain conduit for maintaining the pitch lock valve in an open position when said pressure regulating means diverts flow from said source to said drain conduit, and means operable to maintain said pitch lock valve in a closed position in the absence of said diverted flow from the pressure regulating means.

9. The combination set forth in claim 8 wherein said pitch lock valve includes a second piston having connection with said one conduit for opening said pitch lock valve when said control valve directs fluid flow to said servo-motor in a manner tending to increase propeller pitch irrespective of said diverted flow from the pressure regulating means.

References Cited in the file of this patent

UNITED STATES PATENTS

| | | |
|---|---|---|
| 2,028,766 | Ernst et al. | Jan. 28, 1936 |
| 2,328,979 | Herman et al. | Sept. 7, 1943 |
| 2,328,980 | Herman et al. | Sept. 7, 1943 |
| 2,331,026 | Harrington | Oct. 5, 1943 |
| 2,343,416 | Keller | Mar. 7, 1944 |
| 2,536,138 | Moore | Jan. 2, 1951 |
| 2,618,121 | Tucker | Nov. 18, 1952 |

FOREIGN PATENTS

| | | |
|---|---|---|
| 603,795 | Great Britain | June 23, 1948 |